(12) United States Patent
Wheatley

(10) Patent No.: US 6,256,844 B1
(45) Date of Patent: Jul. 10, 2001

(54) TIE-DOWN ANCHOR ASSEMBLY

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 09/433,399

(22) Filed: Nov. 3, 1999

(51) Int. Cl.$^7$ .............................. B60P 7/08; B61D 45/00
(52) U.S. Cl. .................. 24/265 CD; 410/110; 24/115 R
(58) Field of Search ......... 24/265 CD, 265 EC, 24/115 K, 115 R, 130, 514, 569; 410/110, 116, 106; 114/218; 248/499; 296/249, 238

(56) References Cited

U.S. PATENT DOCUMENTS

| | | | |
|---|---|---|---|
| 4,762,449 | * | 8/1988 | St. Pierre et al. ............... 248/499 X |
| 4,812,093 | * | 3/1989 | Millar, Jr. ............................ 410/110 |
| 4,850,770 | | 7/1989 | Millar, Jr. . |
| 4,953,820 | | 9/1990 | Yoder . |
| 5,443,341 | * | 8/1995 | Hamilton ............................. 410/110 |
| 5,542,367 | * | 8/1996 | DuBios, III et al. ............ 114/218 X |
| 5,560,576 | | 10/1996 | Cargill . |
| 6,039,520 | * | 3/2000 | Cheng .................................. 410/106 |

* cited by examiner

Primary Examiner—Robert J. Sandy
(74) Attorney, Agent, or Firm—Harness, Dickey & Pierce P.L.C.

(57) ABSTRACT

A tie-down anchor for attachment to a side rail of a pickup truck bed. The tie-down anchor assembly comprises an anchor plate having an upright portion that defines a side face having an anchor protruding therefrom. The anchor is positioned on the face beneath the upper end of the plate and at a distance closer to the upper end than to the lower end of the plate. A mounting means for mounting the plate to the side rail is also provided. In this manner, the side rail is loaded in shear generally at its top when the tie-down anchor assembly of the present invention is mounted thereto and a tie-down member is secured to the anchor of the assembly.

16 Claims, 3 Drawing Sheets

TIE-DOWN ANCHOR ASSEMBLY

BACKGROUND OF THE INVENTION

The present invention relates to a tie-down anchor assembly and more particularly to a tie-down anchor assembly which is mounted to the side rail of a pickup truck bed.

DESCRIPTION

One of the advantages of owning a pickup truck is the ability to carry loads within the truck bed or cargo box. Typically, pickup trucks are manufactured and sold without any means by which to secure or restrain a load in the truck bed. Since original equipment providers have opted not to provide such means, the after market has devised various devices which will allow for the securing and restraint of loads being carried in the truck bed. Ropes, straps, bungi cords, or other means (generally referred to as tie-downs) are primarily used to secure these loads.

One type of commercially available tie-down anchor is the stake pocket tie-down anchor. Stake pocket tie-down anchors mount into a stake pocket located in the top surface of the side rail of the pickup truck bed. One drawback of stake pocket tie-down anchors is that they can only be used where a stake pocket is located. Many of the smaller trucks currently available today are produced without stake pockets and, therefore, such stake pocket tie-down anchors are not adaptable to these trucks.

Other tie-down anchors are also available. These are typically designed to be permanently attached to the bed of the pickup truck by bolts or machine screws. As a result, they necessitate the undesirable drilling into the floor of the truck bed or into the side rail itself. As undesirable as drilling is, the possibility remains for machine screws to rip out under the stress of a heavy load.

Another style of tie-down anchor is one which clamps to the side rail, generally at any desired point therealong. Such anchors have been seen to utilize eye-bolts and hooks in conjunction with a generally C-shaped clamping member to provide an anchor point for the tie-down.

A limitation with above styles of tie-down anchors, which either mount within the stake pocket or otherwise clamp to the side rail, is the manner in which the load is transferred to the side rail. By mounting the tie-down anchor into the stake pocket, the anchor or loop of the stake pocket tie down anchor is positioned directly above the stake pocket and above the side rail. When the load is secured to the stake pocket tie-down anchor by a tie-down, a significant bending load is applied to the side rail. This bending load is such that applied forces tend to roll the side rail into the truck bed. Similarly, the clamp-on variety of tie-down anchors have been constructed such that the anchor is positioned above the top surface of the side rail, in a manner very similar to a stake pocket tie-down, or in a position inside the pickup truck bed on a flange extending downwardly from the top surface of the side rail. When mounted down on this flange, a tie-down secured to the anchor also imparts a significant bending load to the side rail.

With the above limitations of the prior art in mind, it is an object of the present invention to provide a tie-down anchor assembly for a pickup truck bed which eliminates or minimizes bending loads applied to the side rail of the truck bed.

It is another object of the present invention to provide a tie-down anchor assembly which does not require drilling into the pickup truck bed in order to mount the assembly thereto.

A feature of the present invention is therefore the ability of the tie-down anchor assembly to clamp to the side rail of the pickup truck bend, generally at any point along the length of the side rail.

Another object of the present invention is to provide a tie-down anchor assembly with a protruding anchor that defines a tie-down, lead-off area that generally coincides with the top surface of the side rail so that when a lateral force is applied from a tie-down, the top surface of the side rail will be substantially loaded in shear as opposed to bending.

Yet another object of the present invention is to provide a tie-down anchor assembly which is self-positioning when mounted to the side rail of the pickup truck bed so that shear loads will be applied to the side rail as opposed to bending loads.

SUMMARY OF THE PRESENT INVENTION

In achieving the above and other objects, a tie-down anchor assembly is provided which substantially loads the sidewall of the pickup truck bed in shear when a load is secured thereto by a tie-down. The tie-down anchor assembly clamps to the side rail and can be adjustably positioned along the length of the side rail, so as to accommodate the requirements in restraining a given load.

Accordingly, the tie-down anchor assembly of the present invention is for use attached to a side rail of a pickup truck bed, the side rail having a top surface and a flange downwardly extending from an inner edge of the top surface. The tie-down anchor assembly comprises an anchor plate having an upright portion that defines a side face. The plate also has an upper end, a lower end with the upper end positioned adjacent to the top surface of the side rail when the tie-down anchor assembly is mounted thereto. An anchor protrudes from the side face of the plate and is positioned on the face beneath the upper end and at a distance closer to the upper end than to the lower end of the plate. A mounting means for mounting the plate to the side rail is also provided. In this manner, the side rail is loaded in shear generally at its top when the tie-down anchor assembly of the present invention is mounted thereto and a tie-down member is secured to the anchor of the assembly.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
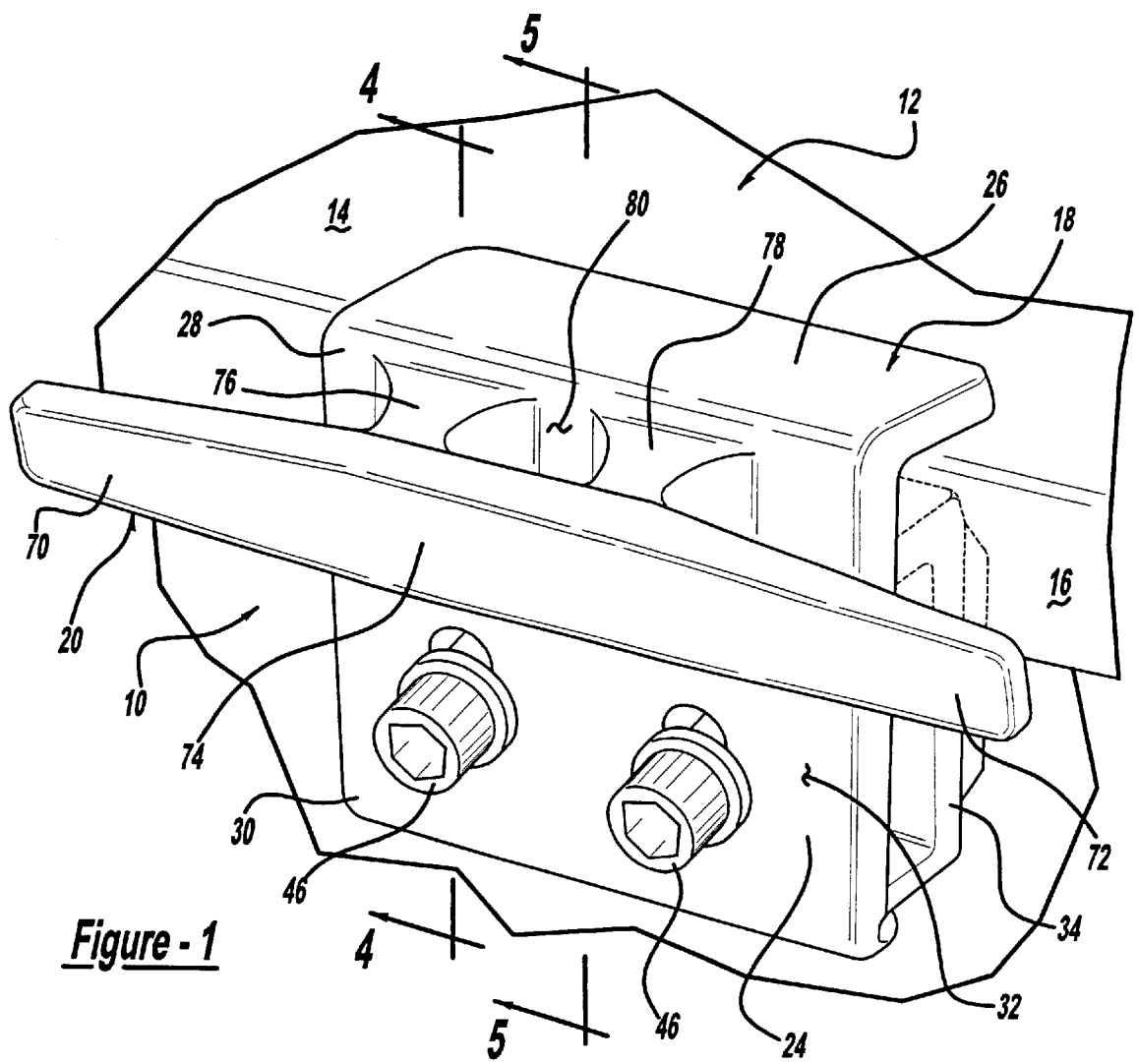
FIG. 1 is a perspective view of a tie-down anchor assembly embodying the principles of the present invention.
Figure 2:
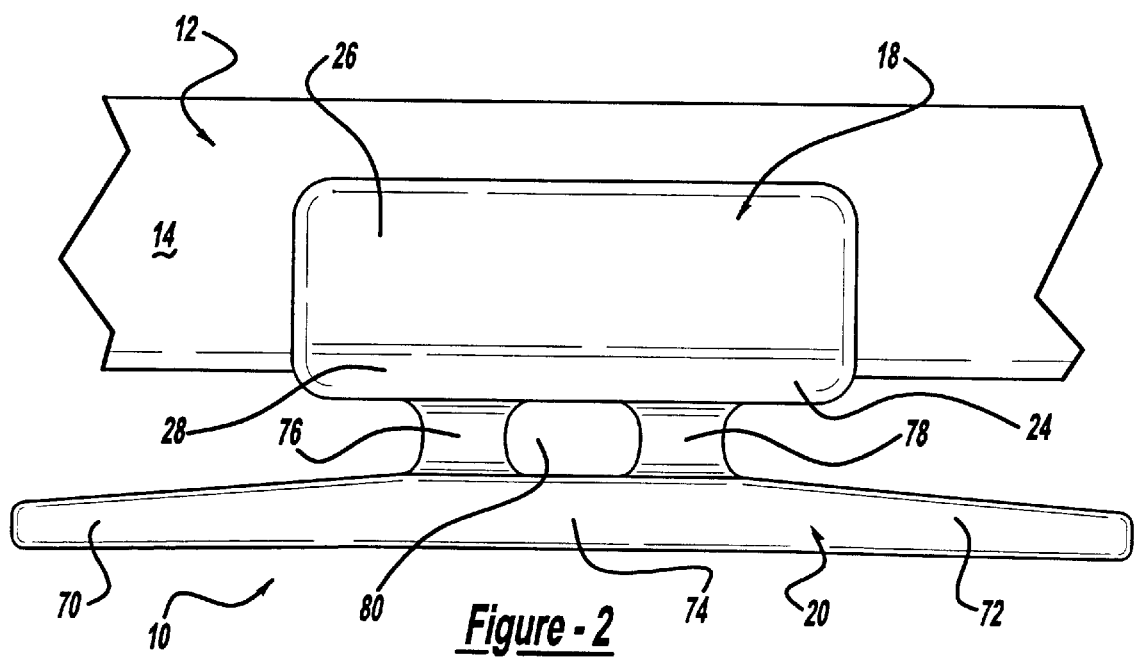
FIG. 2 is a top plan view of the tie-down anchor assembly seen in FIG. 1.
Figure 3:
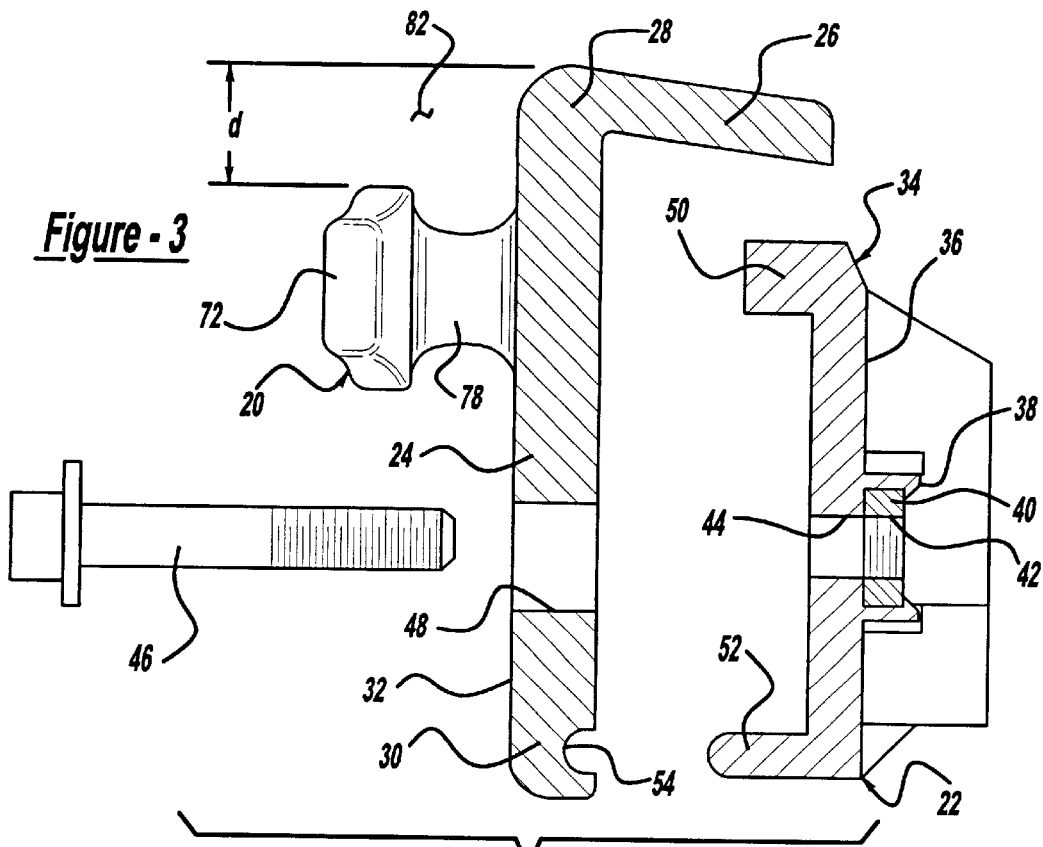
FIG. 3 is an exploded sectional view of the tie-down anchor assembly of the present invention.

Referring now to the drawings, a tie-down anchor assembly 10 embodying the principles of the present invention is illustrated therein mounted to a side rail 12 of a pickup truck bed. The side rail 12 generally includes a top 14 and a flange 16. The flange 16 extends downwardly from an inboard edge of the top surface 14 and is thus located toward the interior of the pickup truck bed.

The tie-down anchor assembly 10 itself (hereinafter just "anchor assembly 10") is made up of three principle components. These components include an anchor plate 18, an anchor 20 and a mounting means or clamp assembly 22.

The anchor plate 18 (hereinafter just "plate 18") is comprised of first and second portions, respectively designated at 24 and 26, which give the plate 18 an inverted L-shaped configuration. The first portion 24 of the plate 18 is the larger of the two portions and extends in an upright orientation when the anchor assembly 10 is mounted to the side rail 12 of the pickup truck bed. Accordingly, the first portion 24 has an upper edge 28, a lower edge 30 and a surface which defines a side face 32 in the direction of the interior of the truck bed. The second portion 26 extends generally transversely from the upper edge 28 of the first portion 24. Extending in this manner, the second portion 26 partially overlays the top surface 14 of the side rail while the first portion 24 overlays the flange 16 of the side rail 12. As further noted below, the second portion 26 cooperates with the first portion 24 and the side rail 12 to enable the anchor assembly 10 to be self-positioning on the side rail 12.

To secure the anchor assembly 10 to the side rail 12, the anchor assembly 10 is provided with a clamp assembly 22. The clamp assembly 22 comprises in part a C-shaped clamp 34. On the rear surface 36 of the C-shaped clamp 34, projecting lugs 38 retain a threaded nut 40 and prevent its rotation. An aperture 42 of the nut 40 is aligned with a bore 44 extending completely through the C-shaped clamp 34.

To clamp the anchor assembly 10 to the side rail 12, a threaded fastener 46, such as a bolt, is extended through an upright slot 48 defined in the first portion 24 of the plate 18. Once inserted through the slot 48, the bolt 46 engages the nut 40 and draws the C-shaped clamp 34 toward the first portion 24 of the plate 18. As it is drawn toward the plate 18, an upper leg 50 of the C-shaped clamp will impinge the flange 16 between the upper leg 50 and the first portion 24 of the plate 18. A lower leg 52 of the C-shaped clamp 34 is shaped at its end to matingly engage a recessed portion 54 in the lower end 30 of the plate 18, thereby locating the C-shaped clamp 34 relative to the plate 18.

As a redundant feature and to evenly distribute the clamping loads utilized in retaining the anchor assembly 10 to the side rail, a second bolt 46 engages with a second set of common features on the C-shaped clamp 34. In that these features are the same as those immediately discussed above, they need not be re-described herein.

Prior to tightening of the C-shaped clamp 34, the anchor assembly 10 is vertically clamped to the side rail 12. Vertical clamping ensures that the plate 18 is pulled sufficiently downward onto the side rail 12 such that the second portion 26 of the plate 18 engages the top surface 14 of the side rail 12, thereby properly locating features more fully discussed below. Vertical clamping of the anchor assembly 10 is accomplished by a threaded fastener 56 being extended through a vertical bore 58 in the C-shaped clamp 34. In order to advance the bolt 56 through the bore 58 such that an end of the bolt engages an underside surface 60 of the side rail 12, captively retained within the C-shaped clamp is a nut 62. Threads on the internal aperture 64 of the nut 62 cooperate with external threads 64 on the bolt 56 to allow for advancement and retraction of the bolt 56 as desired.

Projecting from the side face 32 of the first portion 24 of the plate 18 is the anchor 20. The anchor 20 is not just located anywhere along the plate 18. Rather, the anchor 20 is specifically located on the plate 18 such that when a tie-down member, illustrated in phantom and designated at 68, is secured to the anchor 20, the side rail 12 is substantially loaded in shear thereby substantially eliminating or reducing the application of bending loads to it.

In the illustrated embodiment, the anchor 20 is shown as being a cleat and as such includes opposing lateral extensions 70 and 72 from a central portion 74.

Obviously, other variants of an anchor 20 could similarly be used. The central portion 74 and extensions 70 and 72 are connected to the plate 18 by a pair of bases 76 and 78 which are integrally formed with the central portion 74. Utilizing a pair of bases 76 and 78, a central opening 80 is defined between the bases 76 and 78 and between the central portion 74 and the first portion 24 of the plate 18. The central opening 80 allows for a variety of tie-downs 68 to be readily used with the anchor assembly 10 of the present invention.

As mentioned previously, the anchor 20 protrudes from the plate 18 in a predetermined location. This location is such that the anchor 20 is located closer to the upper end 28 of the first portion 24 than to the lower end 30 of the first portion 24. In one preferred construction, the uppermost surface of the anchor 20, as defined by the central portion 74, is positioned so as to be within one-half inch of the terminal edge of the upper end 28 of the first portion 24. While this one-half inch spacing generally designated at "d" is preferred, it is anticipated that spacing less than one-half inch or greater than one-half inch could be employed without departing from the present invention, so long as the other characteristics as described herein are met.

Figure 4:
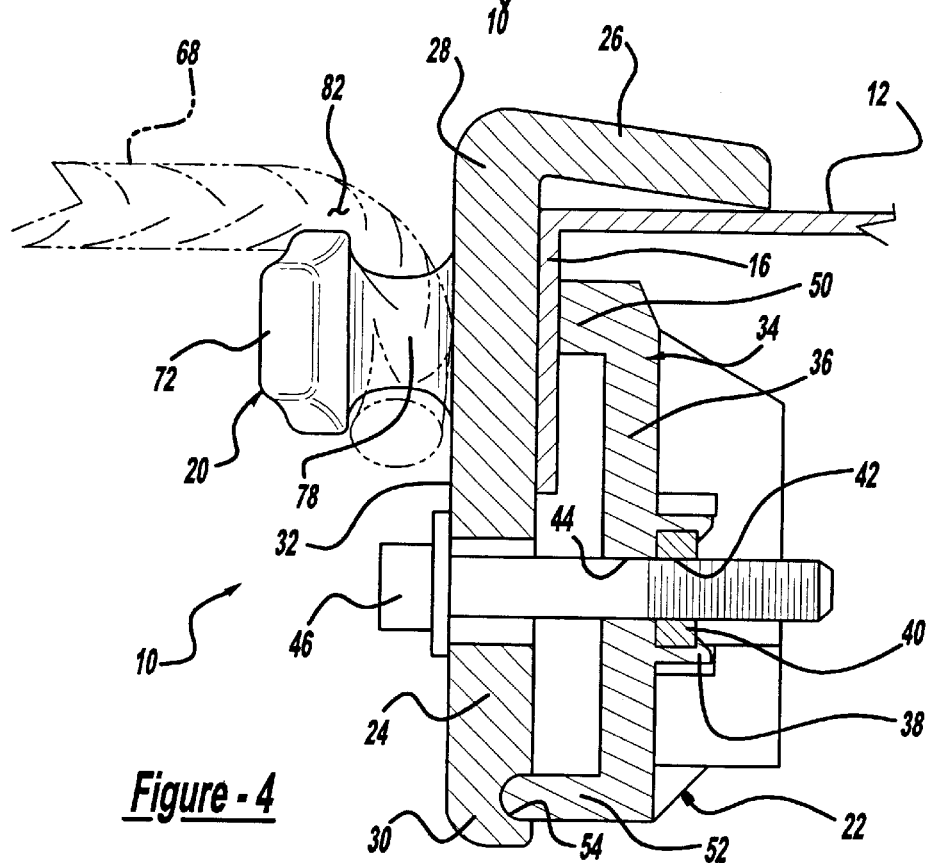
FIG. 4 is a sectional view taken substantially along line 4—4 in FIG. 1 of the tie-down anchor assembly of the present invention.
Figure 5:
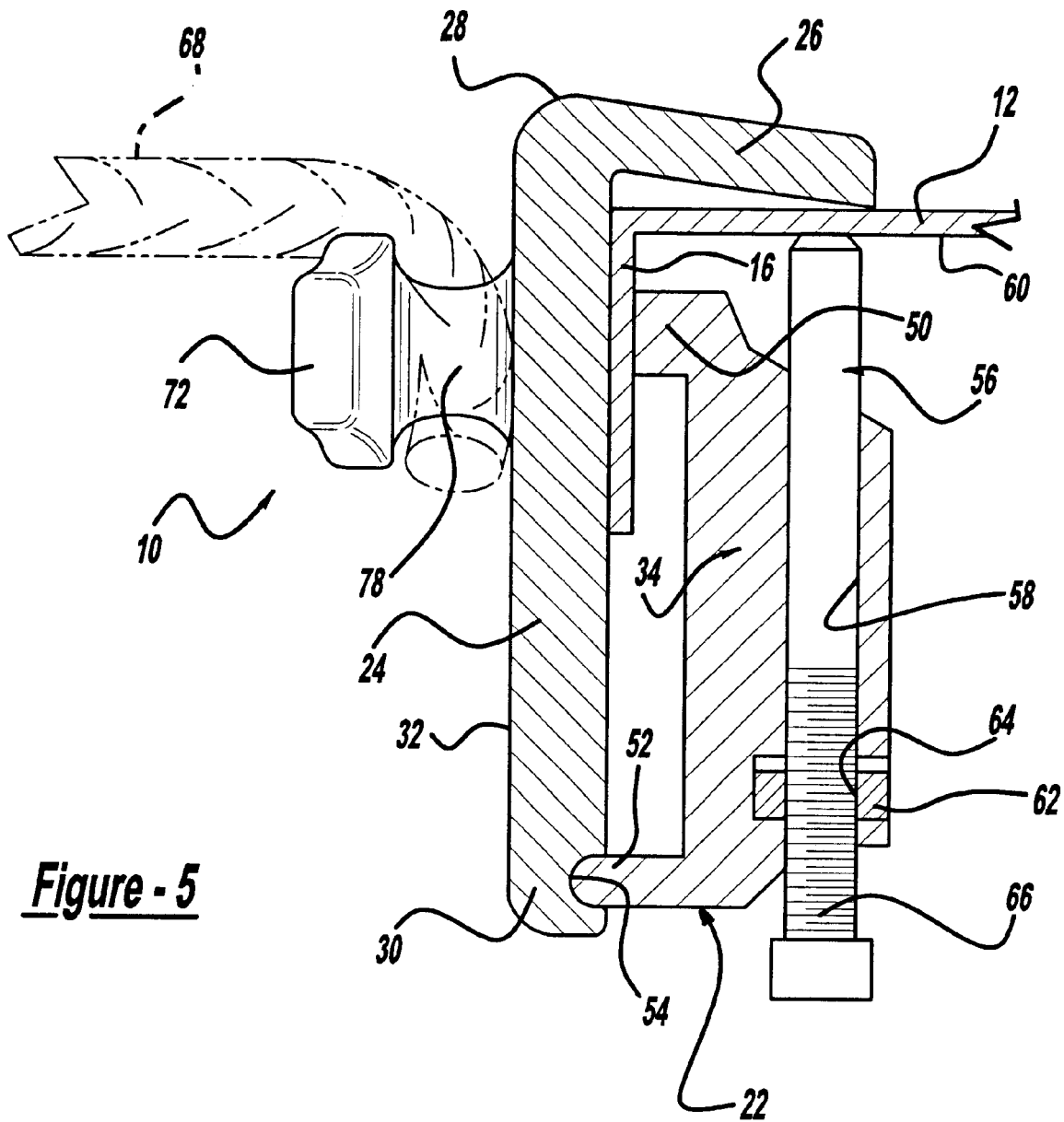
FIG. 5 is a sectional view taken substantially along line 5—5 in FIG. 1 of the tie-down anchor assembly of the present invention.

The positioning of the anchor 20 is such that the anchor 20 defines a lead-off area which coincides with the top surface 14 of the side rail 12. The lead-off area is the area where the tie-down 68 would extend away from the side rail 12 off of the anchor 20 when in use. As seen in FIGS. 4 and 5, the lead-off area with the present anchor 20 is immediately above the central portion 74 and within spacing d. The lead-off area is generally designated at 82. As seen herein, the lead-off area coincides with the top 14 of the side wall 12. This coincidence of the lead-off area 82 with the top 14 of the side rail 12 provides for the shear loading induced by the present invention. Clearly, so long as a lead-off area is provided as described, the precise shape and style of anchor 20 can be desired form.

While the above description constitutes the preferred embodiment of the present invention, it will be appreciated that the invention is susceptible to modification, variation and change without departing from the proper scope and fair meaning of the accompanying claims,

I claim:

1. A tie-down anchor assembly for use attached to a side rail of a pickup truck bed, the side rail having a top surface and a flange downwardly extending from an inner edge of said top surface, said tie-down anchor assembly comprising:

an anchor plate, said plate having an upright portion defining a side face, said plate also having an upper edge, a lower edge, said upper edge positioned adjacent to the top surface of the side rail when said tie-down anchor assembly is mounted thereto;

an anchor protruding from said side face, said anchor fixed to said anchor plate in a position on said face beneath said upper edge and at a distance closer to said upper edge than to said lower edge, said anchor defining a lead-off area being coincident with the top of the side rail;

mounting means for mounting said plate to the side rail; and whereby the side rail is loaded in shear generally at the top when said tie-down anchor assembly is mounted thereto and a tie-down member is secured to said anchor.

2. A tie-down anchor assembly as set forth in claim 1 wherein an upper surface of said anchor is located adjacent to the top of the side rail when said tie-down down anchor assembly is mounted thereto.

3. A tie-down anchor assembly as set forth in claim 1 wherein a portion of said anchor defines said lead-off area as an area where a rope tied to said anchor will extend laterally off of said anchor.

4. A tie-down anchor assembly as set forth in claim 3 wherein said anchor is a cleat.

5. A tie-down anchor assembly as set forth in claim 4 wherein said lead-off area is at least partially defined by an upper surface of said cleat.

6. A tie-down anchor assembly as set forth in claim 1 wherein said plate further includes a lateral portion, said lateral portion extending laterally off of said upright portion.

7. A tie-down anchor assembly as set forth in claim 6 wherein said lateral portion extends off of said upright portion at said upper edge thereof.

8. A tie-down anchor assembly as set forth in claim 6 wherein said lateral portion extends in a direction opposite of said anchor so as to be positioned over the top surface of the side rail when mounted thereto.

9. A tie-down anchor assembly as set forth in claim 8 wherein said lateral portion is spaced a predetermined distance beyond said anchor thereby self-positioning said anchor relative to the top of the side rail when mounted thereto.

10. A tie-down anchor assembly as set forth in claim 1 wherein said mounting means being adapted to mount said plate to the side rail without drilling.

11. A tie-down anchor assembly as set forth in claim 1 wherein said mounting means includes a clamping member, said clamping member being secured to said plate by a threaded fastener.

12. A tie-down anchor assembly as set forth in claim 11 wherein said mounting means includes a vertical positioning means for engaging an underside surface beneath the top of said side rail.

13. A tie-down anchor assembly for use attached to a side rail of a pickup truck bed, the side rail having a top surface and a flange downwardly extending from an inner edge of said top surface, said tie-down anchor assembly comprising:

an anchor plate, said plate having an upright portion defining a side face, said plate also having an upper edge, a lower edge, said upper edge positioned adjacent to the top surface of the side rail when said tie-down anchor assembly is mounted thereto;

an anchor protruding from said side face, said anchor positioned on said face beneath said upper edge and at a distance closer to said upper edge than to said lower edge, said anchor defining a lead-off area being coincident with the top of the side rail;

mounting means for mounting said plate to the side rail; and whereby the side rail is loaded in shear generally at the top when said tie-down anchor assembly is mounted thereto and a tie-down member is secured to said anchor;

wherein said plate further includes a lateral portion, said lateral portion extending laterally off of said upright portion; and wherein said lateral portion extends off of said upright portion at said upper edge thereof.

14. A tie-down anchor assembly for use attached to a side rail of a pickup truck bed, the side rail having a top surface and a flange downwardly extending from an inner edge of said top surface, said tic-down anchor assembly comprising:

an anchor plate, said plate having an upright portion defining a side face, said plate also having an upper edge, a lower edge, said upper edge positioned adjacent to the top surface of the side rail when said tie-down anchor assembly is mounted thereto;

an anchor protruding from said side face, said anchor positioned on said face beneath said tipper edge and at a distance closer to said upper edge than to said lower edge, said anchor defining a lead-off area being coincident with the top of the side rail;

mounting means for mounting said plate to the side rail; and whereby the side rail is loaded in shear generally at the top when said tie-down anchor assembly is mounted thereto and a tie-down member is secured to said anchor;

wherein said plate further includes a lateral portion, said lateral portion extending laterally off of said upright portion; and wherein said lateral portion extends in a direction opposite of said anchor so as to be positioned over the top surface of the side rail when mounted thereto.

15. A tie-down anchor assembly for use attached to a side rail of a pickup truck bed, the side rail having a top surface and a flange downwardly extending from an inner edge of said top surface, said tie-down anchor assembly comprising:

an anchor plate, said plate having an upright portion defining a side face, said plate also having an upper edge, a lower edge, said upper edge positioned adjacent to the top surface of the side rail when said tic-down anchor assembly is mounted thereto;

an anchor protruding from said side face, said anchor positioned on said face beneath said upper edge and at a distance closer to said upper edge than to said lower edge, said anchor defining a lead-off area being coincident with the top of the side rail;

mounting means for mounting said plate to the side rail; and whereby the side rail is loaded in shear generally at the top when said tie-down anchor assembly is mounted thereto and a tie-down member is secured to said anchor;

wherein said plate further includes a lateral portion, said lateral portion extending laterally off of said upright portion;

wherein said lateral portion extends in a direction opposite of said anchor so as to be positioned over the top surface of the side rail when mounted thereto; and wherein said lateral portion is spaced a predetermined distance beyond said anchor thereby self-positioning said anchor relative to the top of the side rail when mounted thereto.

16. A tie-down anchor assembly for use attached to a side rail of a pickup truck bed, the side rail having a top surface and a flange downwardly extending from an inner edge of said top surface, said tie-down anchor assembly comprising:

an anchor plate, said plate having an upright portion defining a side face, said plate also having an upper edge, a lower edge, said upper edge positioned adjacent to the top surface of the side rail when said tie-down anchor assembly is mounted thereto;

an anchor protruding from said side face, said anchor positioned on said face beneath said upper edge and at a distance closer to said upper edge than to said lower edge, said anchor defining a lead-off area being coincident with the top of the side rail;

mounting means for mounting said plate to the side rail; and whereby the side rail is loaded in shear generally at the top when said tie-down anchor assembly is mounted thereto and a tie-down member is secured to said anchor;

wherein said mounting means includes a clamping member, said clamping member being secured to said plate by a threaded fastener; and wherein said mounting means includes a vertical positioning means for engaging an underside surface beneath the top of said side rail.

\* \* \* \* \*

UNITED STATES PATENT AND TRADEMARK OFFICE
CERTIFICATE OF CORRECTION

PATENT NO. : 6,256,844 B1
DATED : July 10, 2001
INVENTOR(S) : Donald G. Wheatley It is certified that error appears in the above-identified patent and that said Letters Patent is hereby corrected as shown below:

Column 6,
Line 9, "tic down" should be -- tie-down --.
Line 16, "tipper" should be -- upper --.
Line 42, "tic-down" should be -- tie-down --.

Signed and Sealed this

Twenty-fifth Day of June, 2002

*Attest:*

JAMES E. ROGAN
*Director of the United States Patent and Trademark Office*

*Attesting Officer*